United States Patent [19]
Silverman

[11] 3,836,759

[45] Sept. 17, 1974

[54] SAFETY LIGHT CIRCUIT

[76] Inventor: Stephen E. Silverman, 187 Wilton Rd., Westport, Conn. 06880

[22] Filed: Aug. 20, 1973

[21] Appl. No.: 389,573

[52] U.S. Cl. ............ 240/6.4 W, 240/10 T, 240/59, 200/DIG. 002, 200/52 R, 340/321
[51] Int. Cl. ...................... F21v 19/00, F21v 33/00
[58] Field of Search...... 200/52 R, DIG. 002, 61.58, 200/166 CT, 167 R, 167 A, 168 E; 2/311–319; 240/6.4 W, 59, 10 T, 10 R; 340/279, 282, 283, 321, 323; 313/108 D; 339/99; 307/157

[56] References Cited
UNITED STATES PATENTS

| | | | |
|---|---|---|---|
| 895,506 | 8/1908 | Sence............................. | 340/279 UX |
| 2,176,789 | 10/1939 | Capitani................................ | 240/59 |
| 2,692,374 | 10/1954 | Corson........................... | 240/10 T X |
| 2,963,572 | 12/1960 | Rullo................................ | 240/10 R |
| 3,458,779 | 7/1969 | Blank et al.................. | 313/108 D X |
| 3,510,732 | 5/1970 | Amans......................... | 313/108 D X |
| 3,720,918 | 3/1973 | Perl...................................... | 240/59 |

OTHER PUBLICATIONS

Solid State Optoelectronics, General Electric, 1-1-72, pp. 1–4, (note p.1, SSL Application Concepts), Bulletin No. 3-1240R.

*Primary Examiner*—James R. Scott
*Attorney, Agent, or Firm*—Auslander & Thomas

[57] ABSTRACT

A circlet attachable around a body portion enfolds rechargeable batteries which operate a safety light which may flash with the battery circuit. The light is optionally positionable to make good electrical contact.

6 Claims, 7 Drawing Figures

PATENTED SEP 17 1974 3,836,759

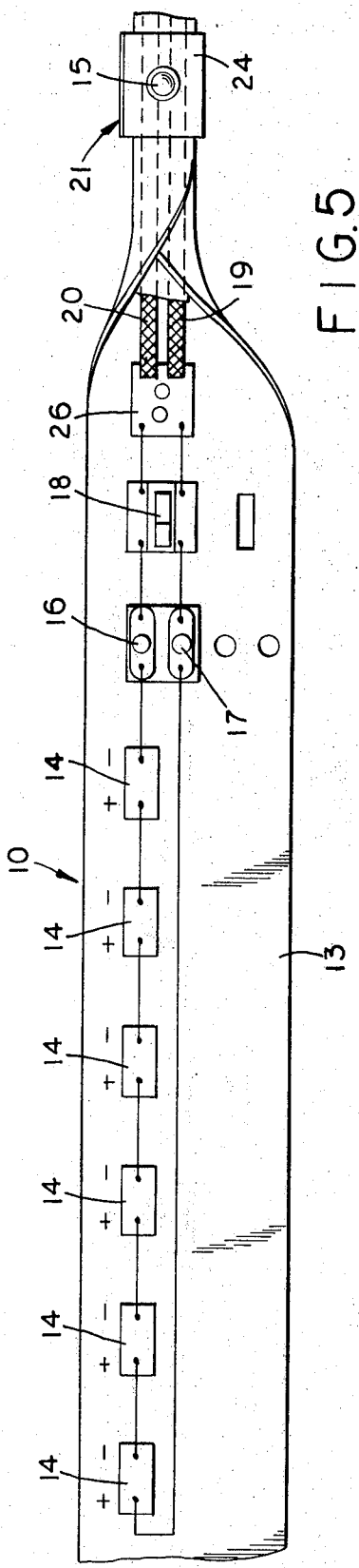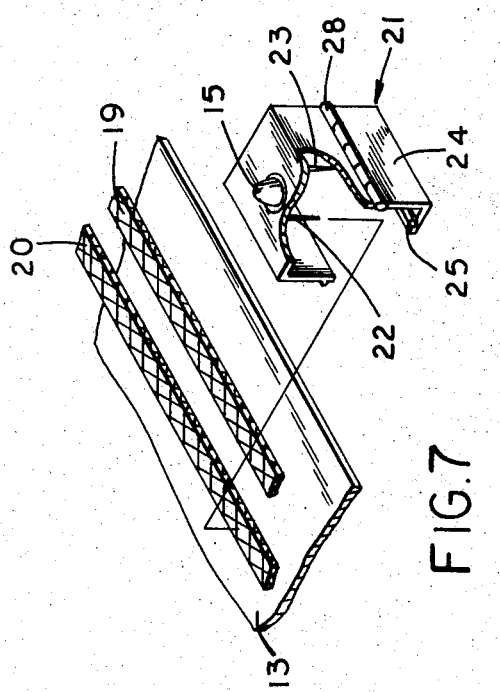

SAFETY LIGHT CIRCUIT

The present invention relates to an improved safety light circlet, preferably including capacity to flash.

In the past, many devices have included lighting devices, flashing lighting devices or circlets with reflectors or lights as safety devices.

Such devices of the past have been complicated or cumbersome and rigid insofar as their adaptability to differing circumstances.

Further, battery operated circlets of the past have been cumbersome and heavy and required frequent, expensive change of batteries.

According to the present invention, a convenient narrow band circlet is provided with a selectively positionable light or lights and batteries integrally installed within the body of the circlet and having an accessible outlet for battery recharging.

Although such novel feature or features believed to be characteristic of the invention are pointed out in the claims, the invention and the manner in which it may be carried out, may be further understood by reference to the description following and the accompanying drawings.

FIG. 5 is a partial open view of a circlet of the present invention.

FIG. 6 is an exploded view of the light and the circlet of the present invention.

FIG. 7 is a view of a circlet of the present invention shown worn on an arm.

Referring now to the figures in greater detail, where like reference numbers denote like parts in the various figures.

Figure 1:
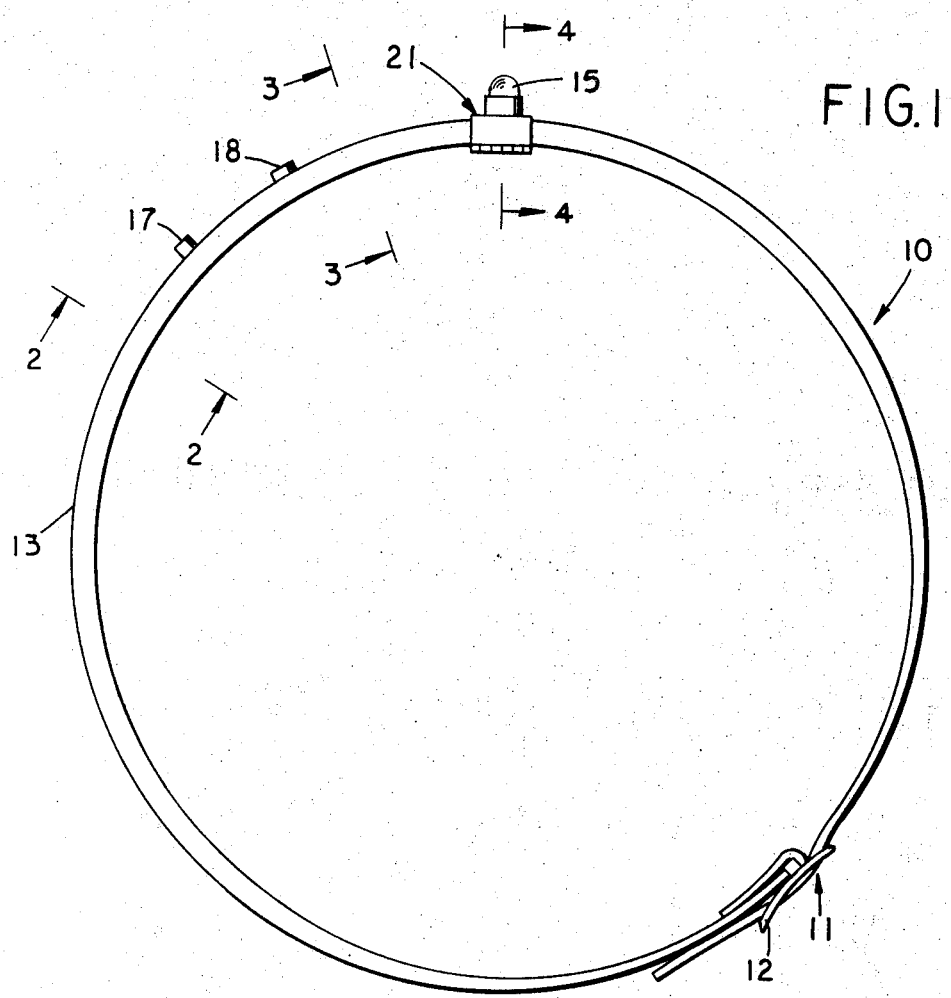
FIG. 1 is a plan view of a circlet of the present invention.

The narrow band circlet 10 of the present invention as shown in FIG. 1 has a closure means 11 as illustrated therein in the form of a buckle 12.

Inside the sheath 13 that forms the circlet 10 are a plurality of small batteries 14, preferably connected in series circuitry through to the light 15.

Figure 2:
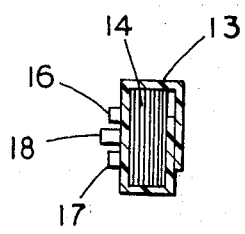
FIG. 2 is a section of FIG. 1 at lines 2—2.

As can be seen in FIG. 2, the sheath 13 is folded over a battery 14, taking a minimum amount of space and allowing the circlet 10 to be in the form of a narrow band.

In FIG. 2, the recharger connector terminals 16, 17 can be seen protruding from the sheath 13 as the sheath 13 enfolds a battery 14. As will be more fully discussed with regard to FIG. 5, the switch 18 can also be seen protruding between the recharger terminals 16, 17.

Figure 3:
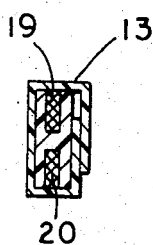
FIG. 3 is a section of FIG. 1 at lines 3—3.

In FIG. 3, the section shows the fine wire leads 19, 20, preferably made of brass braid.

Figure 4:
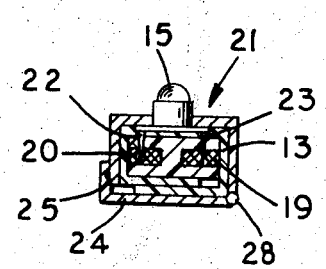
FIG. 4 is a section of the light of FIG. 1 at lines 4—4.

In FIG. 4, the light construction 21 is shown enfolding the circlet 10 with the contacts 22, 23, held by the closure 24 in the latch 25 with the contacts 22, 23 piercing the sheath 13 and the wire leads 19, 20.

As shown, semi-schematically in FIG. 5, a series of small batteries 14 are enfoldable in the sheath 13 in series circuitry. In circuit with the battery recharger terminals 16, 17, in the same circuit, is an off-on switch 18, a flashing circuit 26 and the wire leads 19, 20 of fine wire braided brass.

In operation, it is preferable to have the batteries 14 in series in order to obtain a higher voltage though it is deemed to be within the scope of the present invention to have batteries 14 in parallel circuitry. Ordinary battery cells such as the cells of a nine-volt transistor battery have the size, power capacity and rechargeability satisfactory for use with the present invention.

Of course, nickel cadmium batteries and other small batteries are also well adapted to the present invention.

Battery and light life tend to be improved by the use of a flashing circuit 26.

The flashing of the light is important to attract attention in darkness when the circlet 10 is worn on an arm 27 as shown in FIG. 7.

The use of the braided wire leads 19, 20 enfolded in the sheath 13 permits the selective placement of the light construction 21 at an optimum or desired location. More than one light construction 21 may be used with the circlet 10 of the present invention.

The sheath 13 may be made of vinyl or even leather and may be heat sealed or sewn or otherwise enfolded. The sheath 13 further must be penetrable by the contacts 22, 23.

The light construction 21 preferably has a light 15 comprising a light emitting diode in the light construction 21. A closure 24 is mounted on a hinge 28 which allows the closure 24 to swing closed, compressing the contacts 22, 23 through the sheath 13 and into the leads 19, 20, latching itself closed on the latch 25.

The light controls 21 may thus be placed anywhere along the sheath 13 where the lead wires 19, 20 are enfolded.

The narrow band sheath 13 may satisfactorily hold the lead wires 19, 20 apart avoiding short circuitry or insulation (not shown) may be interposed between or about the lead wires 19, 20.

When not in use, or when the batteries are low, the circlet 10 may be unbuckled and have its terminals 16, 17 plugged into a recharger (not shown).

The terms and expressions which are employed are used as terms of description, it is recognized, though, that various modifications are possible.

Having thus described certain forms of the invention in some detail, what is claimed is:

1. A safety light circlet comprising a narrow band sheath, means to fasten the ends of said sheath together, at least one battery enclosed within said sheath, parallel arranged strip conductors within said sheath, said parallel arranged strip conductor in circuit within said at least one battery, and an electric light support construction including a pair of electric contacts protruding therefrom, said electric contacts adapted to pierce said sheath at selected locations juxtaposing said parallel arranged strip conductors, said contacts making contact with said parallel arranged strip conductors, an electric light in circuit with said contacts, said electric light support construction including latching means to latch said electric light support construction clasped to said narrow band sheath.

2. The invention of claim 1 including a switch in circuit with said at least one battery and said lead wires.

3. The invention of claim 1 including recharge terminals in circuit with said at least one battery.

4. The invention of claim 1 including a flashing circuit in circuit with said at least one battery and said lead wires.

5. The invention of claim 1 wherein said light is a light emitting diode.

6. The invention of claim 1 wherein said lead wires are of brass braid.

* * * * *